US 6,691,421 B2

(12) United States Patent
Roth et al.

(10) Patent No.: US 6,691,421 B2
(45) Date of Patent: Feb. 17, 2004

(54) UNIVERSAL NON-ELECTRONIC MULTI-SECTIONAL GRADIENT METER AND INCLINOMETER AND METHOD OF USE

(76) Inventors: Hans U. Roth, Quellenstrasse 19, CH-9214 Kradolf (CH); Martin Sachsenmaier, Zelgli 2, 8586 Erlen (CH)

( * ) Notice: Subject to any disclaimer, the term of this patent is extended or adjusted under 35 U.S.C. 154(b) by 0 days.

(21) Appl. No.: 10/104,643

(22) Filed: Mar. 22, 2002

(65) Prior Publication Data

US 2002/0162236 A1 Nov. 7, 2002

Related U.S. Application Data

(63) Continuation-in-part of application No. 09/791,935, filed on Dec. 20, 2000.

(51) Int. Cl.$^7$ .................................................. G01C 9/24
(52) U.S. Cl. ........................................... 33/379; 33/371
(58) Field of Search .......................... 33/347, 370, 371, 33/379–389

(56) References Cited

U.S. PATENT DOCUMENTS

| | | | |
|---|---|---|---|
| 377,870 A | | 2/1888 | St. John |
| 653,446 A | * | 7/1900 | Gohl ........................... 33/349 |
| 655,561 A | * | 8/1900 | Kurig ........................... 33/387 |
| 824,109 A | | 6/1906 | Gibson |
| 1,630,172 A | * | 5/1927 | Custer ........................... 33/386 |
| 1,730,109 A | | 10/1929 | Bacon |
| 1,855,651 A | | 4/1932 | Roberson |
| 2,514,500 A | | 7/1950 | Kroener |
| 2,752,693 A | * | 7/1956 | Wullschleger ............... 33/379 |
| 3,225,451 A | * | 12/1965 | Olexson et al. ............... 33/347 |
| 3,245,150 A | * | 4/1966 | Roe et al. ..................... 33/370 |
| 3,585,962 A | | 6/1971 | Vartia |
| 3,597,972 A | | 8/1971 | Ryder |
| 3,673,696 A | * | 7/1972 | Wasson ........................ 33/370 |
| 3,842,514 A | * | 10/1974 | Scheyer ........................ 33/379 |
| 4,543,731 A | | 10/1985 | Boundy |
| 4,977,680 A | * | 12/1990 | Marshall ....................... 33/347 |
| 5,063,679 A | * | 11/1991 | Schwandt ..................... 33/347 |
| 5,279,041 A | | 1/1994 | Wright |
| 5,791,676 A | * | 8/1998 | Jones ............................ 33/388 |

FOREIGN PATENT DOCUMENTS

| | | | | |
|---|---|---|---|---|
| DE | 415724 | | 7/1925 | |
| DE | 822442 | | 11/1951 | |
| DE | 3535624 A | | 4/1987 | |
| DE | 4129861 A1 | * | 3/1993 | ................... 33/365 |
| EP | 0919786 A1 | | 6/1999 | |
| FR | 002672121 A1 | | 7/1992 | |
| GB | 2206693 A | | 1/1989 | |
| SU | 1515043 A | | 10/1989 | |

\* cited by examiner

Primary Examiner—G. Bradley Bennett
(74) Attorney, Agent, or Firm—Pandiscio & Pandiscio

(57) ABSTRACT

A novel apparatus and method for use in measuring surface slope is disclosed. In a preferred embodiment, the measurement apparatus includes a fluid case having an arch of flat segments forming a sloped ceiling. In another preferred embodiment, a smooth curve, instead of a series of flat segments, is formed by reducing the length, and increasing the number, of the constant slope flat segments. And in a preferred embodiment, the apparatus provides a mechanism for compensating for any expansion or contraction of the fluid in the fluid case. A method for measuring the slope of a surface includes providing a measurement apparatus, placing the measurement apparatus adjacent the surface and reading an indicator corresponding to the slope of the surface.

35 Claims, 8 Drawing Sheets

UNIVERSAL NON-ELECTRONIC MULTI-SECTIONAL GRADIENT METER AND INCLINOMETER AND METHOD OF USE

REFERENCE TO PENDING PRIOR PATENT APPLICATION

This patent application is a continuation-in-part of pending prior U.S. patent application Ser. No. 09/741,935, filed Dec. 20, 2000 by Hans U. Roth et al. for UNIVERSAL NON-ELECTRONIC MULTI-SECTIONAL GRADIENT METER AND INCLINOMETER AND METHOD OF USE, which patent application is hereby incorporated herein by reference.

FIELD OF THE INVENTION

This invention relates to measurement tools in general. More particularly, this invention relates to measurement tools used to non-electronically measure surface gradient and inclination.

BACKGROUND OF THE INVENTION

Tools for measuring surface gradient or surface inclination are well known in the art. For example, on construction sites, and in other situations, accurate and precise measurement must often be considered for the gradient and the inclination of a surface. Currently, water-level instrumentation and electronic instrumentation are typically used to indicate whether or not a particular surface is level.

Currently, water-level instrumentation generally does not accurately indicate the percentage of gradient and amount of inclination for a non-level surface.

Electronic instrumentation is used in some applications for measuring the gradient and inclination of surfaces. However, many applications are in relatively harsh or rough environments, such as construction sites, and the use of electronic instrumentation is frequently not practical due to various factors. These factors include environmental factors, such as shock sensitivity, and the replacement cost for broken or damaged electronic instrumentation.

The foregoing demonstrates the need for novel instrumentation to measure surface gradient and surface inclination. Ideally, the measurement instrumentation should be highly accurate and precise for measuring surface gradient and surface inclination. The measurement instrumentation should also be unaffected by most environmental factors. Furthermore, the measurement instrumentation should be inexpensive to manufacture.

SUMMARY OF THE INVENTION

These and other objects are addressed by the present invention, which comprises a novel apparatus and method for use in measuring surface slope, including gradient and inclination, in such places as a construction site. The present invention provides a universal non-electronic multi-sectional gradient meter and inclinometer.

The measurement apparatus includes a fluid case containing a fluid and an indicator, calibrated markings on the fluid case corresponding to the indicator, and a sloped ceiling within the fluid case.

In a preferred embodiment, the sloped ceiling includes several portions forming an arch and each portion having a constant slope. From a portion corresponding to zero slope, the other portions slope downwardly from the portion corresponding to zero slope toward each end of the fluid case, respectively. The portions also have a progressively increasing slope from the zero slope portion to each end, respectively. In this configuration, an arch of flat segments is formed in the profile view of the fluid case's ceiling.

In another preferred embodiment, the sloped ceiling includes several portions forming an arch, each portion having a constant slope along its length. From one end of the fluid case and a portion corresponding to zero slope, each of the other portions slope away from the zero slope portion toward the other end of the fluid case and have progressively increasing slopes. As such, the zero slope portion is located in one end of the fluid case and an arch of flat segments is formed in the fluid case's ceiling.

In another preferred embodiment, the portions in the sloped ceiling are shortened, and additional portions are added, so as to form a smooth curve instead of a series of flat segments.

In still another preferred embodiment, a smooth curve, instead of a series of flat segments, is formed in the sloped ceiling by reducing the length, and by increasing the number, of the constant slope portions.

And in still another preferred embodiment, the fluid case is formed so as to provide a mechanism for compensating for any expansion or contraction of the fluid in the fluid case.

A method for measuring the slope of a surface includes providing a measurement apparatus adjacent the surface, placing the measurement apparatus, and reading an indicator corresponding to the slope of the surface.

BRIEF DESCRIPTION OF THE DRAWINGS

These and other objects and features of the present invention will be more fully disclosed or rendered obvious by the following detailed description of the invention, which is to be considered together with the accompanying drawings wherein like numbers refer to like parts and further wherein.

DETAILED DESCRIPTION OF THE INVENTION

Referring to FIGS. 1–16, a measurement apparatus 5 is shown for measuring the gradient of inclination of a surface (not shown). Measurement apparatus 5 includes a fluid case 10 having an indicator 15, such as an air bubble, and a ceiling 20. Indicator 15 reacts to changes in the elevation of the ceiling 20 as measurement apparatus 5 is disposed on a surface. Ceiling 20 is formed having multiple sections 25. From a portion 30 of ceiling 20 in which indicator 15 signals that apparatus 5 is on a zero slope, or a level surface, sections 25 slope progressively downward toward first end 35 and toward second end 40, respectively. In one form of the invention, each of the sections 25 has a constant slope along its own length. In another form of the invention, sections 25 are integral to one another so as to form a curved surface.

Still looking at FIGS. 1–16, in a preferred embodiment of the invention, fluid case 10 is configured with a wider cross-sectional width along a bottom surface 45 (FIG. 5) and a narrower cross-sectional width along an upper portion 50 adjacent ceiling 20. This configuration is advantageous in that the motion and display of indicator 15 is amplified to indicate the gradient or the inclination of a portion of the surface measured by apparatus 5. Apparatus 5 uses a fluid composition 55 similar to, or the same as, a standard water-level.

Now looking at FIGS. 1–5, apparatus 5 is shown with measurement units 65 in the configuration of a gradient meter. In this embodiment, measurement units 65 include 0.25, 0.5, 1.0, 2.0, 2.5, 3.0 percentage of elevation deviation from exact level 0.0 towards each end 35 and 40, respectively. In other words, when apparatus 5 is placed on a surface and indicator (e.g., air bubble) 15 settles under the measurement unit 65 labeled "2.5", the surface will be 2.5 percent off horizontal. Apparatus 5 may also include other measurement units 65.

Figure 1:
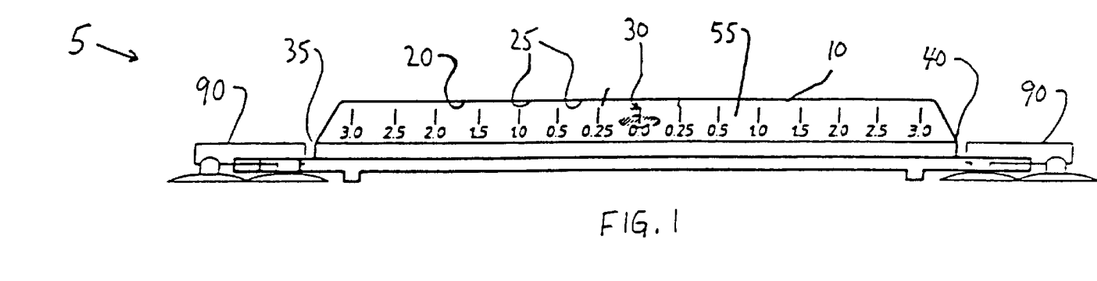
FIG. 1 is a side elevational view of a novel measurement instrument for determining the slope of a surface.
Figure 2:
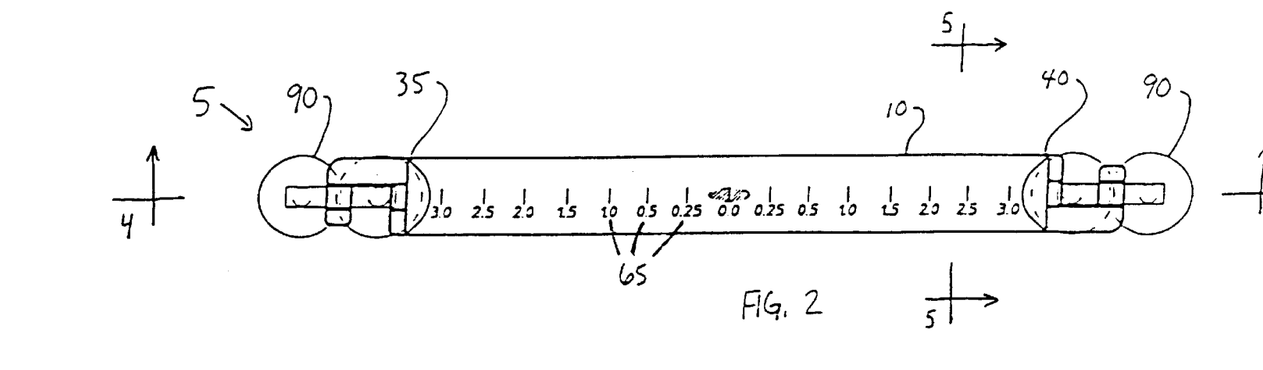
FIG. 2 is a top plan view of the measurement instrument of FIG. 1.
Figures 3, 5:
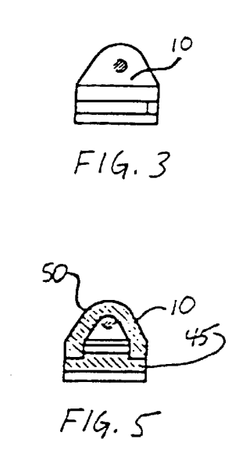
FIG. 3 is an end view of the measurement instrument of FIG. 1.
FIG. 5 is a cross-sectional view taken along line 5—5 of FIG. 2.
Figure 4:
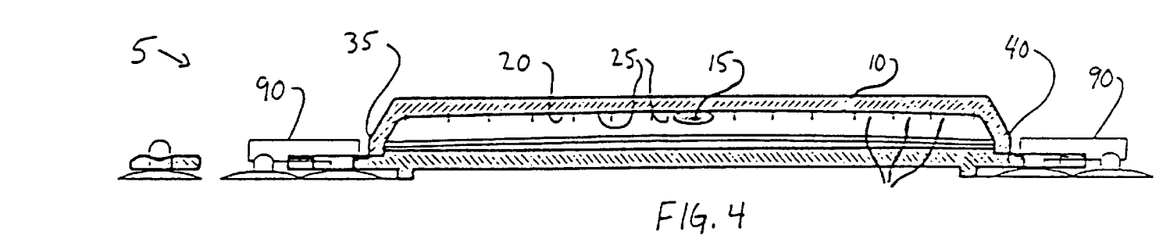
FIG. 4 is a cross-sectional view taken along line 4—4 of FIG. 2.
Figure 6:
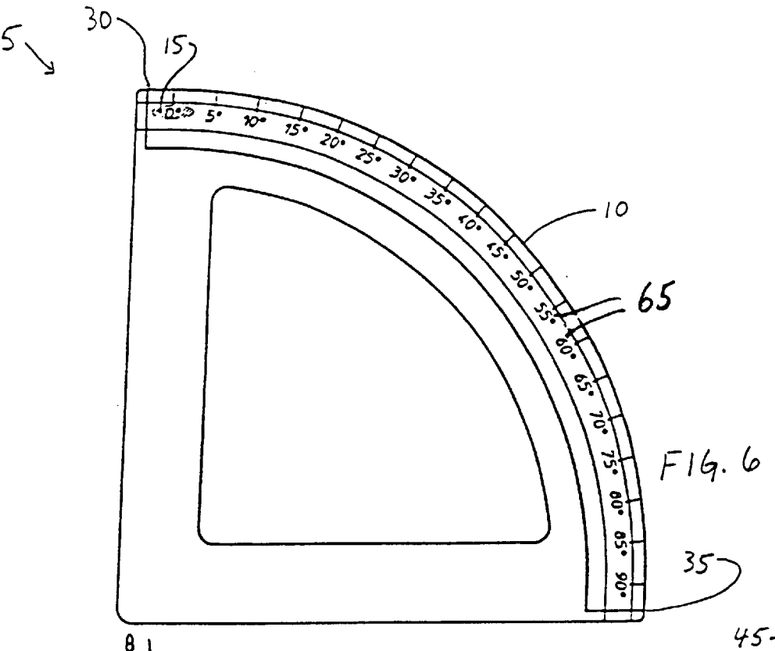
FIG. 6 is a side elevational view of a measurement instrument for determining the slope of a surface.
Figure 7:
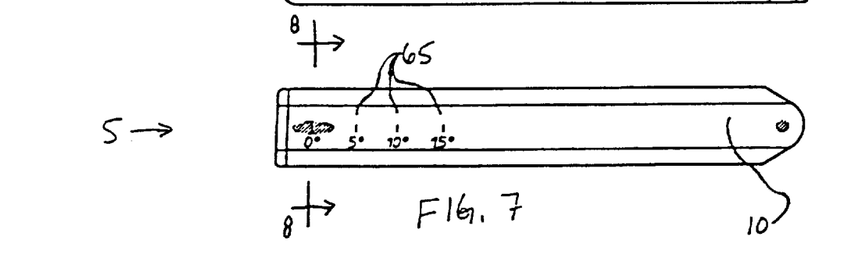
FIG. 7 is a top plan view of the measurement instrument of FIG. 6.
Figure 8:
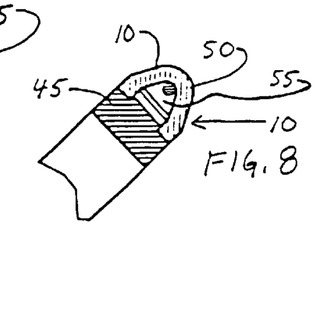
FIG. 8 is a cross-sectional view taken along line 8—8 of FIG. 7.

Now looking at FIGS. 6–8, another preferred embodiment of apparatus 5 is shown in the configuration of an inclinometer. In this embodiment, measurement units 65 include 0°–90° indications, in units of 5°.

Referring now to FIGS. 9–17, in still another preferred embodiment, novel apparatus 5 is shown in several configurations with a conventional level device 70.

Figure 9:
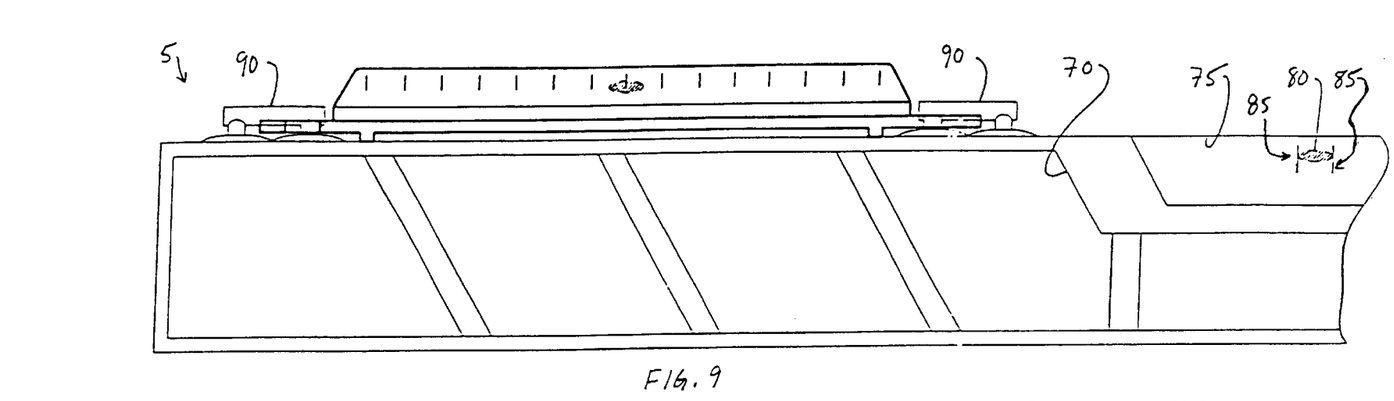
FIG. 9 is a side elevational view of the measurement instrument of FIG. 1 attached to a prior art level.
Figure 10:
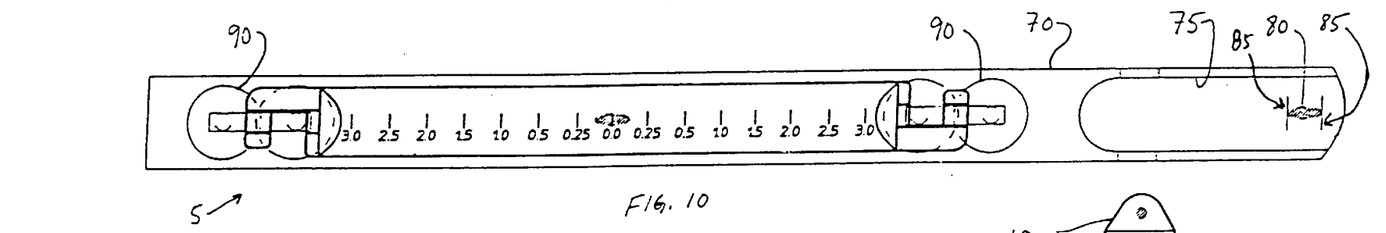
FIG. 10 is a top plan view of the measurement instrument and prior art level of FIG. 9.
Figure 11:
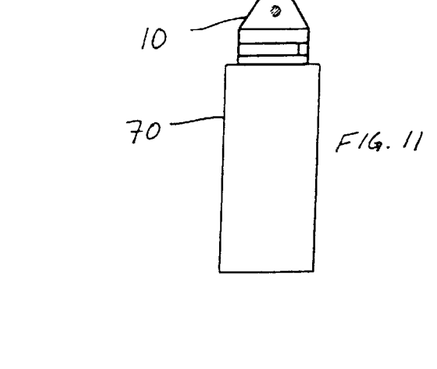
FIG. 11 is an end view of the measurement instrument and prior art level of FIG. 9.

In FIGS. 9–11, novel apparatus 5 is detachably attached to the top of conventional level device 70. Conventional level device 70 has a prior art fluid filled chamber 75 including a bubble 80 to indicate zero slope of a surface when bubble 80 is between lines 85. In this configuration, novel apparatus 5 is attached to conventional level device 70 using attachment means 90. Attachment means 90 include, but are not limited to, suction cups and other temporary or permanent mounting means generally known. In one form of the invention, an aftermarket kit contains apparatus 5 and attachment means 90 to retrofit existing conventional level devices.

Figure 12:
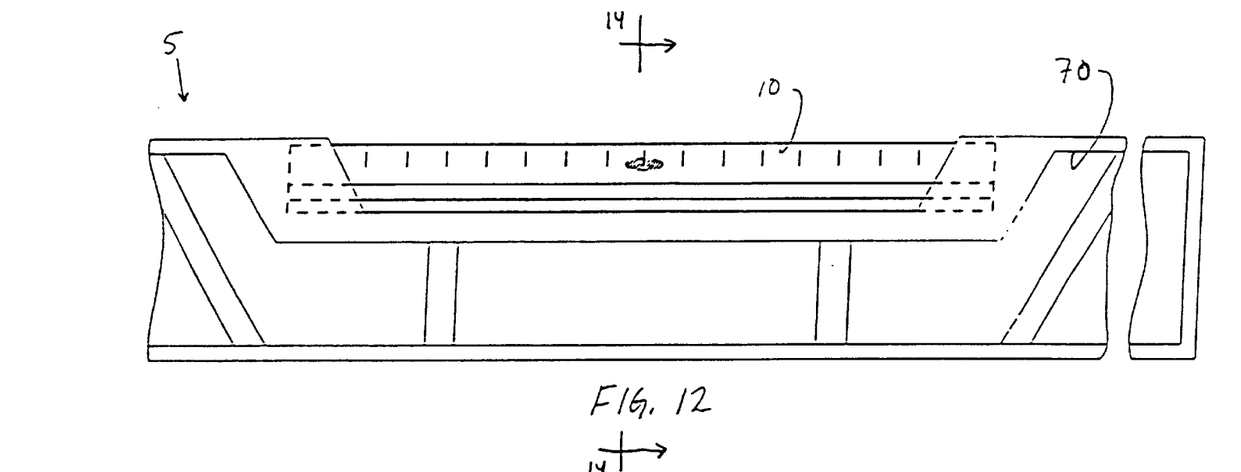
FIG. 12 is a side elevational view of the measurement instrument of FIG. 1 incorporated within a prior art level.
Figure 13:
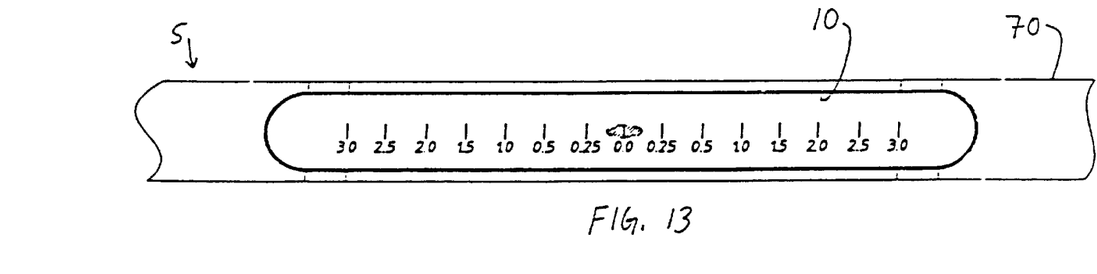
FIG. 13 is a top plan view of the apparatus of FIG. 12.
Figure 14:
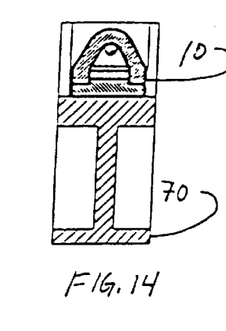
FIG. 14 is a cross-sectional view taken along line 14—14 of FIG. 12.

Looking next at FIGS. 12–14, novel apparatus 5 is shown incorporated within an otherwise-conventional level device 70. In a preferred embodiment, conventional level device 70 and apparatus 5 are manufactured integral with one another as shown. In another preferred embodiment, conventional level device 70 and apparatus 5 manufactured as separate components such that novel apparatus 5 may be quickly and easily replaced if broken or defective.

Figure 15:
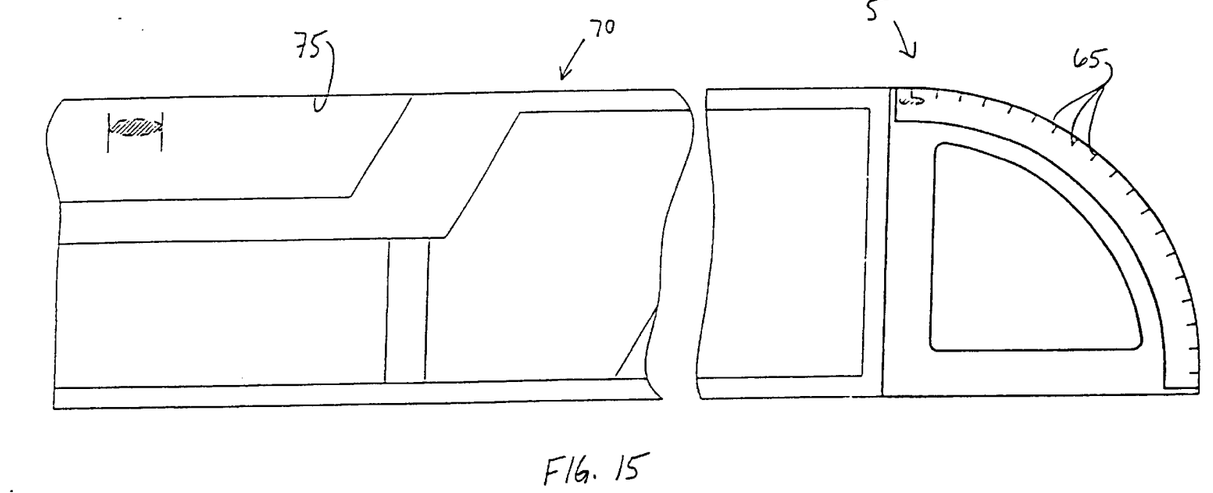
FIG. 15 is a side elevational view of the measurement instrument of FIG. 6 in conjunction with a prior art level.
Figure 16:
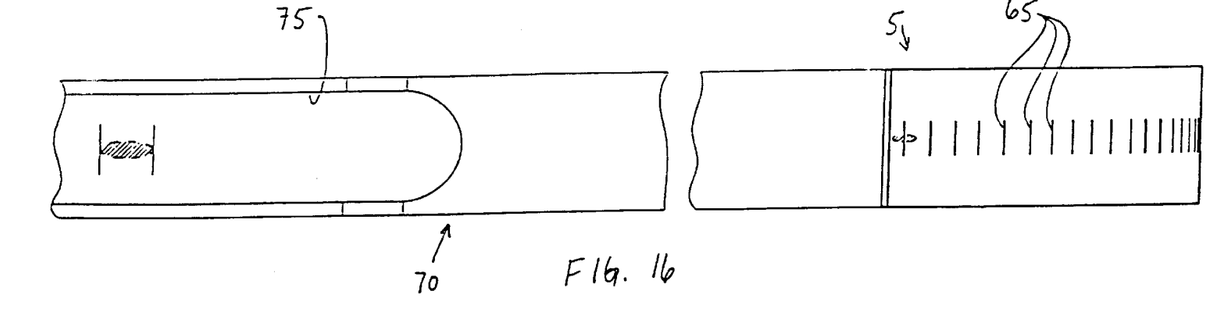
FIG. 16 is a top plan view of the measurement instrument and prior art level of FIG. 15.

Now referring to FIGS. 15 and 16, a preferred embodiment of apparatus 5 is shown in combination with conventional level device 70. Apparatus 5 is mounted at an end of level 70 such that the inclination is indicated by measurement units 65 from above and to the side. The embodiment shown in FIGS. 15 and 16 is similar to the embodiment shown in FIGS. 6–8 above, except that apparatus 5 is attached to the end of a conventional level device 70. In the embodiment of FIGS. 15 and 16, apparatus 5 may be secured to level device 70 during manufacture or apparatus 5 may be sold in a kit with attachment means (not shown) for attachment to an existing level 70.

Figure 17:
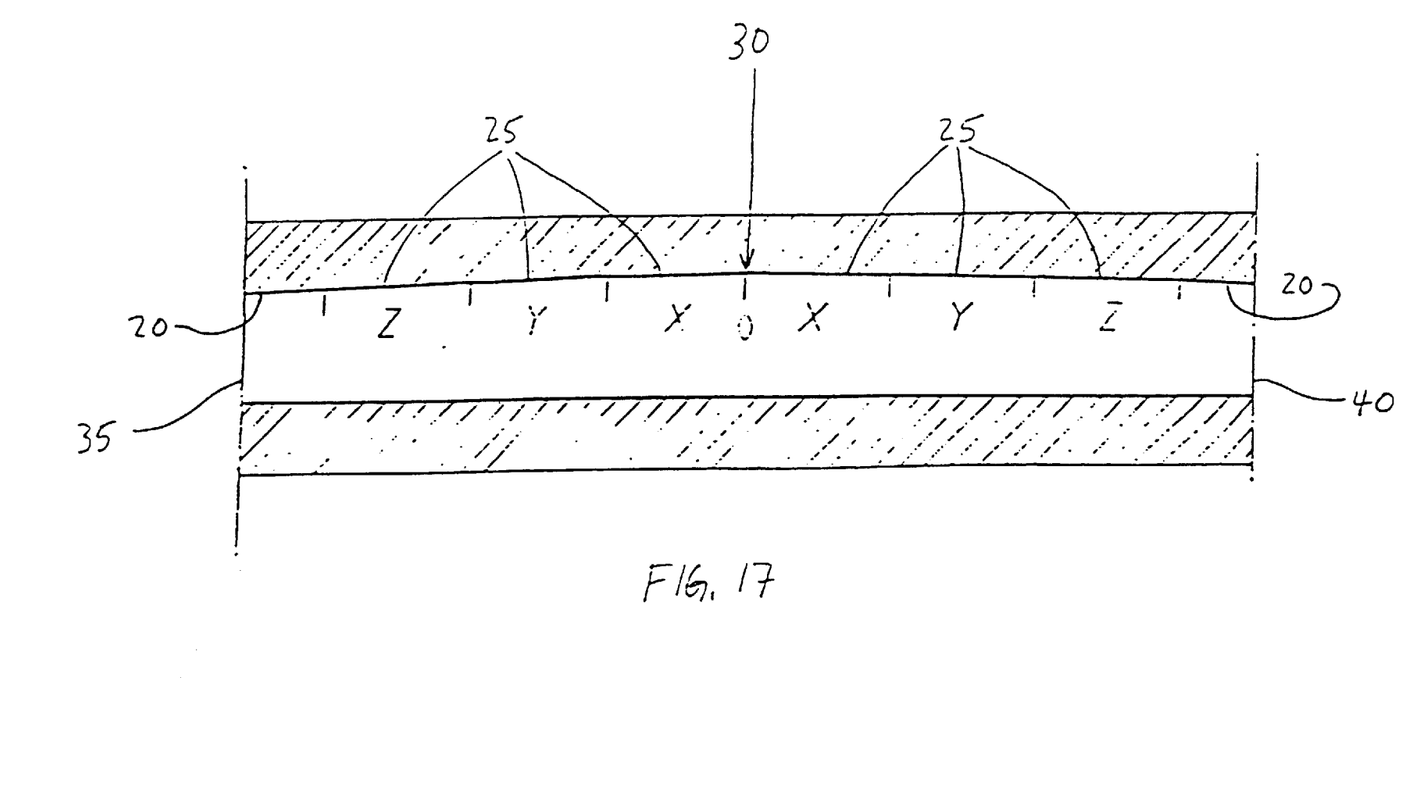
FIG. 17 is a schematic view of a ceiling configuration of the measurement instrument of FIG. 1 in which the regions X, Y, Z each have a constant slope of increasing magnitude to one another from the instrument's level center toward each of the ends, respectively.

Looking now at FIG. 17, three sections 25, including regions X, Y, Z, are each shown on both sides of zero slope portion 30. Regions X, Y, Z, on each side of portion 30, each slope progressively downward from portion 30 toward first end 35 and second end 40, respectively. Each portion is shown with a constant slope over each region X, Y, Z. However, as discussed above, each of the regions X, Y, Z may itself be configured to have an increasing slope along its own length, so as to essentially form a smooth curve over the expanse from portion 30 toward first end 35 and second end 40. A configuration between these two embodiments is accomplished by successively reducing the length of regions X, Y, Z and adding additional sections 25.

It should also be appreciated that in FIG. 17, zero slope portion 30 is shown as the apex of two adjacent sloped sections 25 (i.e., regions X); however, if desired, zero slope portion 30 could also comprise a longitudinally extending surface, of zero slope, extending between adjacent sloped sections 25 (i.e., regions X).

In a preferred embodiment of the invention (not shown), a single unit is disclosed with a first apparatus 5 having a first set of measurement units 65 (e.g., apparatus 5 such as shown in FIGS. 1–5) and a second apparatus 5 having a second set of measurement units 65 (e.g., apparatus 5 such as is shown in FIGS. 6–8). In one configuration, first and second measurement units allow simultaneous measurement on a single surface of its gradient, as a percentage of elevation deviation, and of its inclination, as measured in degrees. Alternatively, first and second measurement units are configured with differing scales. As such, precise measurements can be taken over multiple ranges, rather than one narrow range.

In one preferred embodiment of the present invention, indicator 15 is formed by a gas bubble floating within a fluid 55. This arrangement is relatively simple and inexpensive to manufacture and reliable in operation. However, depending on the materials and/or compositions used to form gas bubble 15 and fluid 55, and depending on the environmental conditions apparatus 5 may be used in (e.g., 0° F. through 110° F.), gas bubble 15 and/or fluid 55 may experience significant thermal expansion or contraction, resulting in a significant increase or decrease in the size of gas bubble 15. Small changes of this type will generally not significantly affect the utility of apparatus 5; however, excessive shrinkage of gas bubble 15 may render the indicator 15 difficult to read, or excessive expansion of gas bubble 15 may render indicator 15 ambiguous as to its precise location, etc.

To this end, and looking next at FIGS. 18–22, there is shown an alternative construction which permits the size of indicator 15 to be increased or decreased as desired. More particularly, in FIGS. 18–20 there is shown apparatus 5 which is generally similar to the apparatus 5 shown in FIGS. 1–5, except that a wall 100 separates main fluid chamber 105 from a supplemental fluid chamber 110, with an aperture 115 connecting supplemental fluid chamber 110 from main fluid chamber 105. Supplemental fluid chamber 110 is used to store a supplemental gas bubble 15A. By passing gas between supplemental gas bubble 15A and indicator gas bubble 15, the size of indicator gas bubble 15 can be adjusted so as to maintain it at the desired size.

Figure 21:
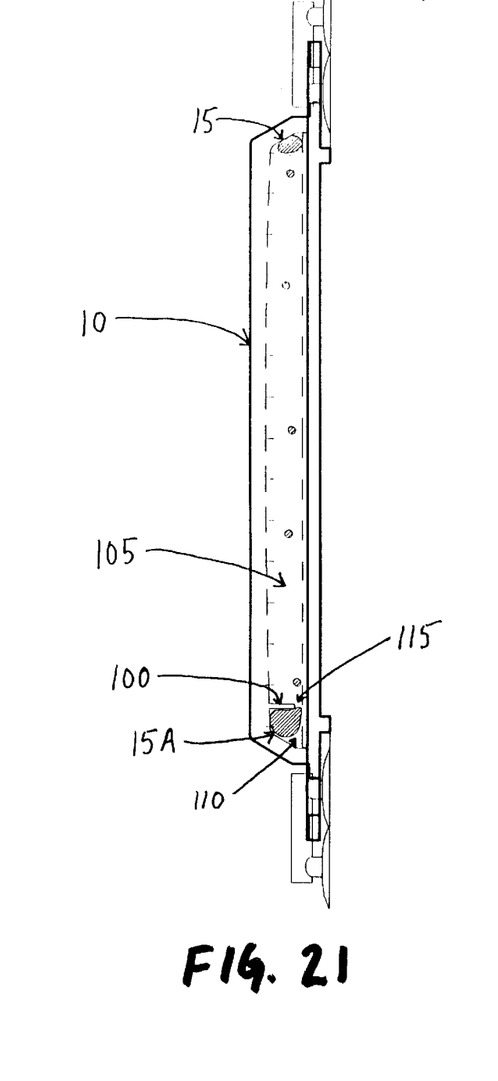
FIG. 21 is a schematic view showing how the indicator gas bubble may be enlarged as desired.

More particularly, and looking next at FIG. 21, suppose thermal conditions have caused the size of indicator gas bubble 15 to decrease to the point where it is adversely affecting use of apparatus 5. In this case, gas may be passed from supplemental gas bubble 15A to indicator gas bubble 15 by turning apparatus 5 as such is shown in FIG. 21, so that some gas will escape from supplemental fluid chamber 110 into main fluid chamber 105 via aperture 115. This will have the desired effect of increasing the size of indicator gas bubble 15.

Figure 22:
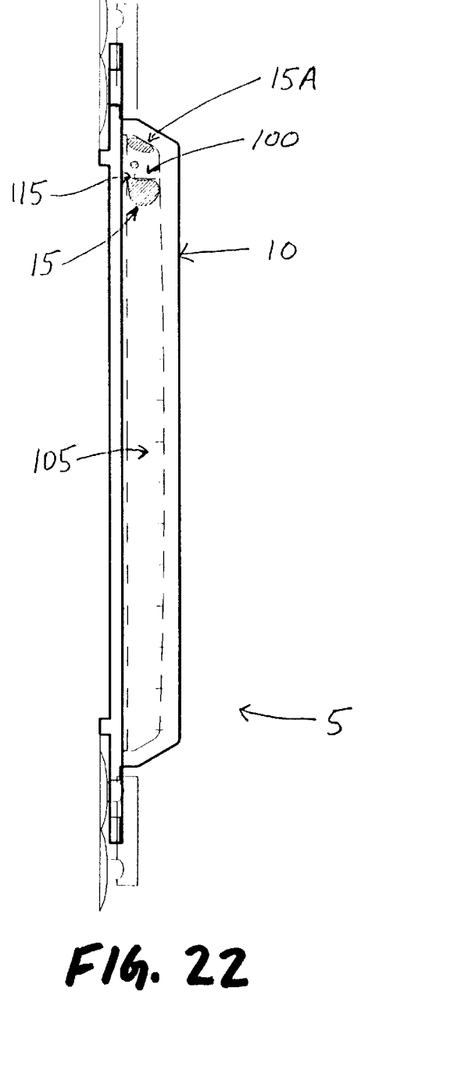
FIG. 22 is a schematic view showing how the indicator gas bubble may be reduced as desired.

Conversely, and looking next at FIG. 22, suppose thermal conditions have caused the size of indicator gas bubble 15 to increase to the point where it is adversely affecting use of apparatus 5. In this case, gas may be passed from indicator gas bubble 15 to supplemental gas bubble 15A by turning apparatus 5 such as shown in FIG. 22, so that some gas will escape from main fluid chamber 105 into supplemental fluid chamber 110 via aperture 115. This will have the desired effect of decreasing the size of indicator gas bubble 15.

In this way, the size of indicator gas bubble 15 may be adjusted by the user so as to compensate for thermal conditions.

Figure 18:
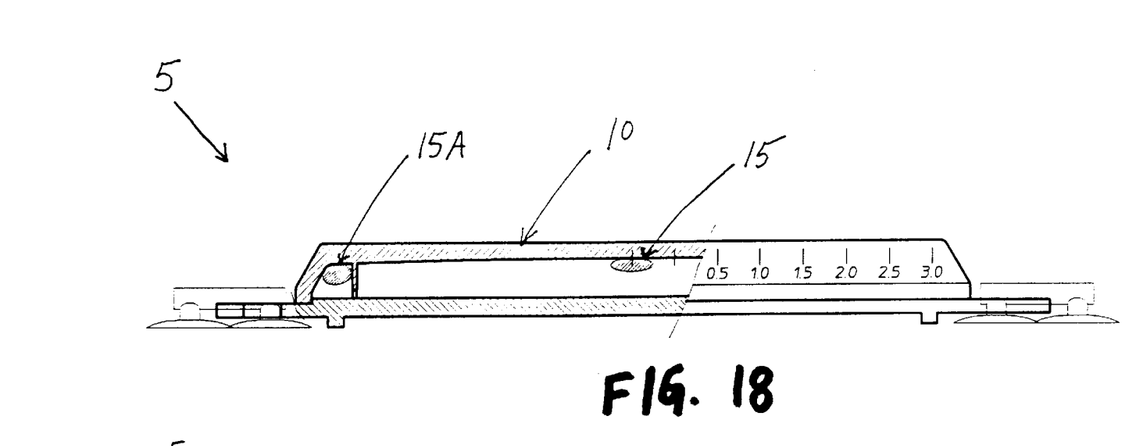
FIG. 18 is a side view, partially in section, of an alternative form of measurement instrument also formed in accordance with the present invention.
Figure 19:
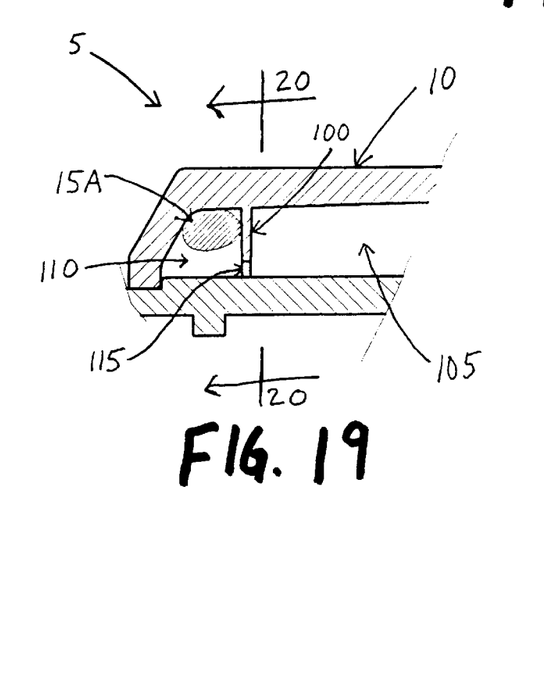
FIG. 19 is an enlarged end view of one end of the measurement instrument shown in FIG. 18.
Figure 20:
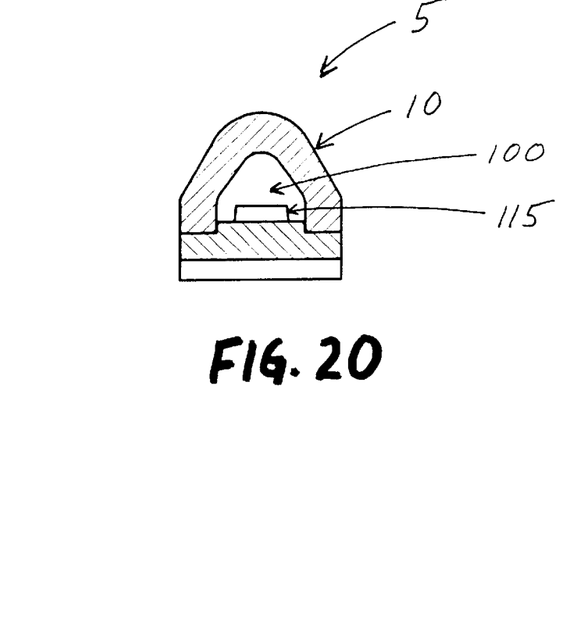
FIG. 20 is a sectional view taken along line 20—20 of FIG. 19.

In order to prevent aperture 115 from unintentionally passing gas during normal use of device 5, aperture 115 is preferably formed on the bottom end of wall 100 and sized so that it will not be contacted by either indicator gas bubble 15 or supplemental gas bubble 15A during normal use of the device. On one preferred embodiment, aperture 115 comprises a gap extending between the bottom end of wall 100 and the floor of main fluid chamber 105 and supplemental fluid chamber 110.

The present invention is not limited to the foregoing specific embodiments, but also encompasses all improvements and substitutions within the scope of the claims.

What is claimed is:

1. A measurement apparatus for measuring the slope of a surface, the apparatus comprising:
   a fluid case having a wall forming a closed container, the fluid case having an upper wall surface, a lower wall surface, a first end, a second end, and a longitudinal axis from the first end to the second end of the fluid case;
   a fluid contained within the fluid case, the fluid having a given density;
   an indicator contained within the fluid case, the indicator having a density less than the given density of the fluid;
   calibrated markings on the fluid case corresponding to the indicator at the positioned slope of the measurement apparatus;
   a sloped ceiling formed in the upper wall surface along the longitudinal axis of the fluid case, a first portion of the ceiling having no slope relative to a flat reference surface, the first portion corresponding to a zero-point of the calibrated markings, and a second portion of the ceiling between the first portion and the first end, the second portion having a constant slope, downwardly, toward the first end; and
   a partition disposed within said closed container, said partition dividing said closed container into a working section and a storing section, with an aperture allowing the indicator to flow between said working section and said storing section.

2. The measurement apparatus of claim 1 wherein the sloped ceiling has a third portion between the first portion and the second end, the third portion having a constant slope, downwardly, toward the second end.

3. The measurement apparatus of claim 1 further comprising a sloped ceiling having a plurality of second portions, each of the second portions having a constant slope, and each of the second portions increasing in slope from the first portion to the first end.

4. The measurement apparatus of claim 2 further comprising a slope ceiling having a plurality of second portions and third portions, the second portions and the third portions each having a constant slope, respectively, and the second portions and the third portions each increasing in slope from the first portion to the first end and the second end, respectively.

5. The measurement apparatus of claim 3 wherein the first portion and the plurality of second portions are infinitely small and form a curved surface.

6. The measurement apparatus of claim 4 wherein the first portion, the plurality of second portions, and the plurality of third portions are infinitely small and form a curved surface.

7. The measurement apparatus of claim 1 wherein the calibrated markings on the fluid case is percentage of elevation.

8. The measurement apparatus of claim 7 wherein the apparatus is a gradient meter.

9. The measurement apparatus of claim 1 wherein the calibrated markings on the fluid case is degree of inclination.

10. The measurement apparatus of claim 1 wherein the apparatus is an inclinometer.

11. The measurement apparatus of claim 1 wherein the indicator being contained within the fluid within the fluid case is an air bubble formed by the fluid.

12. The measurement apparatus of claim 1 wherein the indicator being contained within the fluid within the fluid case is another fluid.

13. The measurement apparatus of claim 1 wherein the indicator being contained within the fluid within the fluid case is a solid object.

14. The measurement apparatus of claim 1 wherein the lower wall surface of the fluid case forms a base having a given wide cross-sectional width orthogonal to the longitudinal axis, and the upper wall surface of the fluid case forms an apex adjacent the slope ceiling having a cross-sectional width orthogonal to the longitudinal axis narrower than the given wide cross-sectional width of the base.

15. The measurement apparatus of claim 1 further comprising means for interfacing the fluid case with the measuring surface.

16. The measurement apparatus of claim 15 wherein the interfacing means comprise a suction cup.

17. The measurement apparatus of claim 15 wherein the interfacing means further comprise a level.

18. The measurement apparatus of claim 1 further comprising a second fluid case.

19. The measurement apparatus of claim 18 wherein the calibrated markings of the fluid case are percentage of elevation and the calibrated marking of the second fluid case are percentage of elevation.

20. The measurement apparatus of claim 19 wherein the percentage of elevation calibrated markings of the fluid case are drawn to a first scale and the percentage of elevation calibrated markings of the second fluid case are drawn to a second scale.

21. The measurement apparatus of claim 18 wherein the calibrated markings of the fluid case are degree of inclination and the calibrated markings of the second fluid case are degree of inclination.

22. The measurement apparatus of claim 21 wherein the calibrated markings for degree of inclination of the fluid case are drawn to a first scale and the calibrated markings for degree of inclination of the second fluid case are drawn to a second scale.

23. The measurement apparatus of claim 18 wherein the calibrated markings of the fluid case are percentage of elevation and the calibrated markings of the second fluid case are degree of inclination.

24. The measurement apparatus of claim 1 wherein said partition extends from said upper wall surface towards said lower wall surface.

25. The measurement apparatus of claim 24 wherein said aperture comprises a gap between said partition and said lower wall surface.

26. A kit for mounting a measurement apparatus for measuring the slope of a surface to an existing level, the kit comprising:

a measurement apparatus for measuring the slope of a surface, the apparatus comprising:
a fluid case having a wall forming a closed container, the fluid case having an upper wall surface, a lower wall surface, a first end, a second end, and a longitudinal axis from the first end to the second end of the fluid case;
a fluid contained within the fluid case, the fluid having a given density;
an indicator contained within the fluid case, the indicator having a density less than the given density of the fluid;
calibrated markings on the fluid case corresponding to the indicator at the positioned slope of the measurement apparatus;
a sloped ceiling formed in the upper wall surface along the longitudinal axis of the fluid case, a first portion of the ceiling having no slope relative to a flat reference surface, the first portion corresponding to a zero-point of the calibrated markings, and a second portion of the ceiling between the first portion and the first end, the second portion having a constant slope, downwardly, toward the first end; and
a partition disposed within said closed container, said partition dividing said closed container into a working section and a storing section, with an aperture allowing the indicator to flow between said working section and said storing section; and means for attaching the measurement apparatus to the existing level.

27. The kit of claim 26 further comprising a second measurement apparatus.

28. The kit of claim 27 wherein the measurement apparatus and the second measurement apparatus have a first scale and a second scale, respectively.

29. The kit of claim 27 wherein the calibrated markings of the measurement apparatus are percentage of elevation and the calibrated markings of the second measurement apparatus are degrees of inclination.

30. The kit of claim 26 wherein said partition extends from said upper wall surface towards said lower wall surface.

31. The kit of claim 30 wherein said aperture comprises a gap between said partition and said lower wall surface.

32. A method for measuring the slope of a surface, the method comprising:

providing a measurement apparatus for measuring the slope of a surface, the apparatus comprising:
a fluid case having a wall forming a closed container, the fluid case having an upper wall surface, a lower wall surface, a first end, a second end, and a longitudinal axis from the first end to the second end of the fluid case;
a fluid contained within the fluid case, the fluid having a given density;
an indicator contained within the fluid case, the indicator having a density less than the given density of the fluid;
calibrated markings on the fluid case corresponding to the indicator at the positioned slope of the measurement apparatus;
a sloped ceiling formed in the upper wall surface along the longitudinal axis of the fluid case, a first portion of the ceiling having no slope relative to a flat reference surface, the first portion corresponding to a zero-point of the calibrated markings, and a second portion of the ceiling between the first portion and the first end, the second portion having a constant slope, downwardly, toward the first end; and
a partition disposed within said closed container, said partition dividing said closed container into a working section and a storing section, with an aperture allowing the indicator to flow between said working section and said storing section;

adjusting the size of the indicator by inducing indicator flow between said working section and said storing section;

placing the measurement apparatus on the surface; and reading the calibrated markings corresponding with the indicator for measuring the slope of the surface.

33. The method of claim 32, further comprising the method step of providing a second measurement apparatus for measuring the slope of a surface.

34. The method of claim 32 wherein said partition extends from said upper wall surface towards said lower wall surface.

35. The method of claim 34 wherein said aperture comprises a gap between said partition and said lower wall surface.

* * * * *